US009245208B2

(12) United States Patent
Balter et al.

(10) Patent No.: US 9,245,208 B2
(45) Date of Patent: Jan. 26, 2016

(54) PATIENT MODELING FROM MULTISPECTRAL INPUT IMAGE VOLUMES

(75) Inventors: James Balter, Ann Arbor, MI (US); Yue Cao, Ann Arbor, MI (US)

(73) Assignee: The Regents of The University of Michigan, Ann Arbor, MI (US)

(*) Notice: Subject to any disclaimer, the term of this patent is extended or adjusted under 35 U.S.C. 154(b) by 422 days.

(21) Appl. No.: 13/570,329

(22) Filed: Aug. 9, 2012

(65) Prior Publication Data

US 2013/0039558 A1  Feb. 14, 2013

Related U.S. Application Data

(60) Provisional application No. 61/522,366, filed on Aug. 11, 2011.

(51) Int. Cl.
| G06K 9/00 | (2006.01) |
| G06K 9/62 | (2006.01) |
| G06T 7/00 | (2006.01) |

(52) U.S. Cl.
CPC .............. *G06K 9/6289* (2013.01); *G06T 7/0081* (2013.01); *G06T 7/0087* (2013.01); *G06T 2207/10088* (2013.01); *G06T 2207/20076* (2013.01); *G06T 2207/20081* (2013.01); *G06T 2207/30016* (2013.01)

(58) Field of Classification Search
None
See application file for complete search history.

(56) References Cited

U.S. PATENT DOCUMENTS

| 5,425,367 | A * | 6/1995 | Shapiro et al. ................. 600/424 |
| 8,319,165 | B2 * | 11/2012 | Holland ............... A01B 79/005 |
| | | | 250/206.1 |
| 8,781,184 | B2 * | 7/2014 | Behrend ............. A61B 3/1233 |
| | | | 382/128 |
| 2006/0023927 | A1 * | 2/2006 | Zhang et al. .................. 382/131 |
| 2006/0239519 | A1 * | 10/2006 | Nowinski et al. ............. 382/128 |
| 2008/0292194 | A1 * | 11/2008 | Schmidt et al. ............... 382/217 |
| 2009/0306496 | A1 * | 12/2009 | Koo et al. ...................... 600/417 |
| 2010/0177950 | A1 * | 7/2010 | Donovan ............. G06F 19/3437 |
| | | | 382/133 |

OTHER PUBLICATIONS

Jacobs et al "A Model for Multiparametric MRI Tissue Characterization in Experimental Cerebral Ischemia With Histological Validation in Rat Part 1" (2001) p. 943-949.*
Huang et al. "MRI Brain Extraction with Combined Expectation Maximization and Geodesic Active Contours." Symposium on Signal Processing and Information Technology. (2006): 107-111.*
Vincent Barra et al "Segmentation of fat and muscle from MR images of the thigh by a possibilistic clustering algorithm" Computer Methods and Programs in Biomedicine 68 (2002).

* cited by examiner

*Primary Examiner* — Nancy Bitar
(74) *Attorney, Agent, or Firm* — Harness, Dickey & Pierce, PLC (57) ABSTRACT

A computer-implemented method is provided for generating patient models from multiple imaging contrast sources which may be, for example from magnetic resonance imaging without computed tomography. The method includes: acquiring multiple sets of image data representing a volume of a patient using magnetic resonance imaging, wherein each set of image data is acquired in a different manner so as to create contrast amongst tissue types of the patient; classifying tissue in each voxel in the volume using the multiple sets of image data as input to a classification algorithm; and generating a patient model for the volume from probability distributions of the classes of tissue as derived from the classification algorithm.

18 Claims, 6 Drawing Sheets

PATIENT MODELING FROM MULTISPECTRAL INPUT IMAGE VOLUMES

CROSS-REFERENCE TO RELATED APPLICATIONS

This application claims the benefit of U.S. Provisional Application No. 61/522,366, filed on Aug. 11, 2011. The entire disclosure of the above application is incorporated herein by reference.

FIELD

The present disclosure relates generally to a method for generating patient models from multiple imaging contrast source which may be used, for example to support treatment planning for radiation therapy.

BACKGROUND

Precision radiation therapy (RT) planning relies on patient models that accurately represent the geometric distribution of cancerous and normal tissues, and which provide information to estimate the radiation transport of the treatment beams through the patient. Computed tomography (CT) scanning has been the primary means of providing these patient models, due to its reasonably known geometric accuracy and relationship between image signals and radiation attenuation. Significant limitations exist with radiation therapy based on CT, however, due to its lack of soft tissue contrast for adequately discriminating tissue types. Magnetic resonance imaging (MRI) not only provides improved contrast between tissue types, it also may serve as an important physiological and molecular biomarker for therapy assessment and adaptation, and may more conveniently assess physiological movement of organs and tumors.

Therefore, it is desirable to develop techniques for generating patient models from magnetic resonance imaging to support treatment planning for radiation therapy. This section provides background information related to the present disclosure which is not necessarily prior art.

SUMMARY

A technique is provided for generating patient models for use in radiation therapy. The method includes: acquiring multiple sets of image data representing a volume of a patient using magnetic resonance imaging, wherein each set of image data is acquired in a different manner so as to create contrast amongst tissue types of the patient; classifying tissue in each voxel in the volume using the multiple sets of image data as input to a classification algorithm; and generating one or more patient models for the volume from probability distributions of the classes of tissue as derived from the classification algorithm.

In one aspect of this disclosure, patient models are generated using a computer-implemented method. The method includes: acquiring multiple sets of image data by varying a pulse sequence and/or acquisition parameters of magnetic resonance imaging between each set of image data in the multiple sets of image data, where each set of image data represents a volume of a patient and is spatially aligned with each other; classifying tissue in the multiple sets of image data into different tissue types using a classification algorithm; and assigning properties to voxels comprising the volume based on a probability distribution of tissue types yielded by the classification algorithm, thereby generating a patient model for the volume. Assigning different properties to voxels in the volume generates different types of patient models which may be used in radiation therapy.

In another aspect of this disclosure, a system is set forth for generating the patient models used in radiation therapy. The system is comprised generally of an imager, a classifier and a property assignor. The imager is configured to capture multiple sets of image data which represents a volume in a patient and is spatially aligned with each other, where each set of image data is acquired in a different manner so as to create contrast amongst tissue types contained in the volume. The classifier is configured to receive the multiple sets of image data from the magnetic resonance imager and operates to classify tissue in each voxel in the volume into different tissue types using a classification algorithm. The property assigner is configured to receive a probability distribution of tissue types for the volume and operates to assign a property to voxels comprising the volume according to the probability distribution, thereby generating a patient model for the volume.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

The drawings described herein are for illustrative purposes only of selected embodiments and not all possible implementations, and are not intended to limit the scope of the present disclosure.

DETAILED DESCRIPTION

Figure 1:
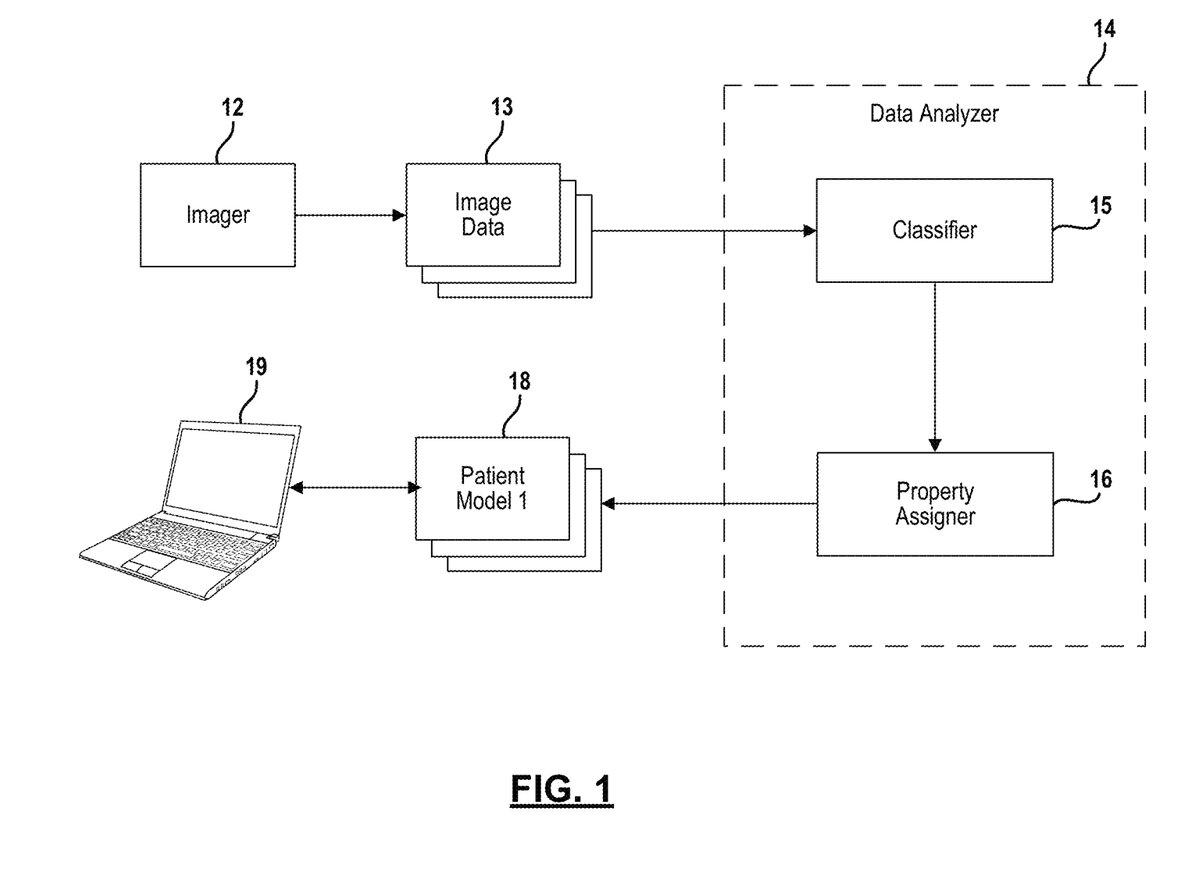
FIG. 1 is a diagram of a system for generating patient models for use in radiation therapy.

FIG. 1 depicts a system 10 for generating patient models for use in radiation therapy. The system 10 is comprised generally of an imager 12 and a data analyzer 14. In an exemplary embodiment, the imager is further defined as a magnetic resonance imaging device although the techniques set forth below may be extended to image data captured by other types of imaging devices, such as positron emission tomography, single photon emission computed tomography, or x-ray computed tomography. The data analyzer 14 may be implemented by any type of computing device having one or more computer processors. The system may further include a secondary computing device 19 having a display to view the generated patient models. In some embodiments, the data analyzer 14 may be integrated with the secondary computing device 19.

The imager 12 is configured to capture multiple sets of image data representing a volume, for example, the brain of the patient. Each set of image data is spatially aligned with each other; that is, defined in a common coordinate system. Each set of image data is also acquired in a different manner so as to create contrast amongst tissue types contained in the volume. For example, a first set of image data is acquired in a first manner that discriminates bone from other tissue types; a second set of image data is acquired in a second manner that discriminates solid tissue from other tissue types; and a third set of image data is a acquired in a third manner that quantifies water and fat tissue in the volume. Different techniques for creating contrast amongst tissue types are readily known, for example, by varying the pulse sequence and/or acquisition parameters (e.g., echo times, flip angles, retention times, etc.) of the magnetic resonance imaging between the different sets of image data.

Figure 2A:
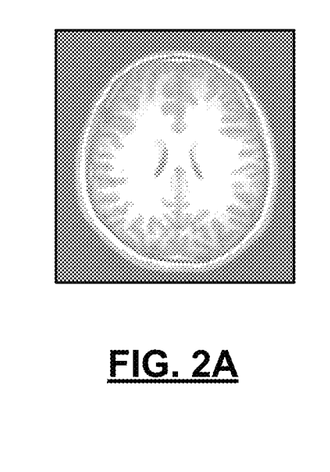
FIGS. 2A-2F are six exemplary images of a brain acquired in different manners so as to create contrast amongst tissue types.
Figure 2B:
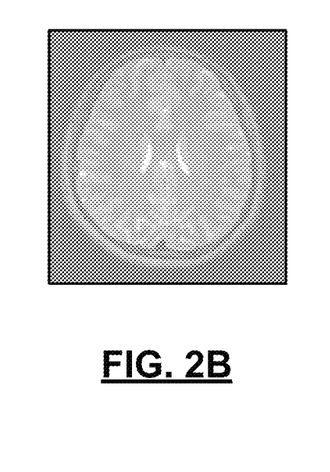

In an exemplary embodiment, six different sets of image data (image volumes) were acquired using four pulse sequences for the volume of interest as shown in FIGS. 2A-2F. In FIG. 2A, the image volume was acquired using a T1-weighted volumetric gradient echo (GRE) scan sequence. In FIG. 2B, the image volume was acquired using a T2 weighted high resolution set of spin echo (SE) scan sequences. The T1 and T2 weighted images provide differential contrast between solid tissues, providing significant anatomic contrast, and help further support segmentation of the tissue classes necessary for supporting dose calculation.

Figure 2C:
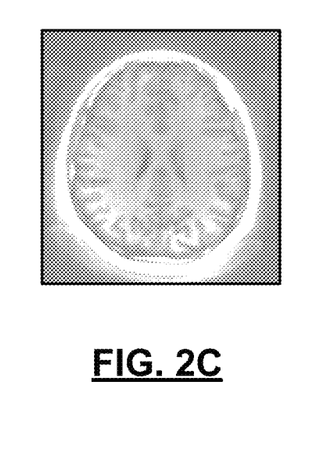
Figure 2D:
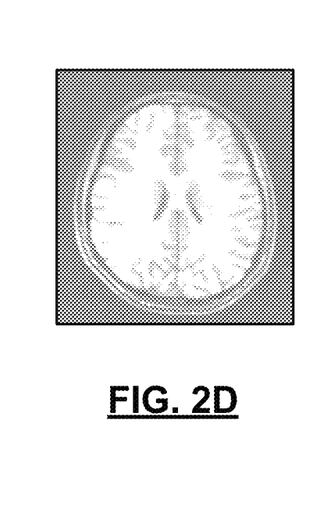

FIGS. 2C and 2D depict additional image volumes acquired using an ultrashort-TE (UTE) imaging sequence, composed of two gradient echo acquisitions with echo times (TEs) of 0.8 and 3.7 ms, respectively. Both UTE source images enhance signals from tissues with shorter T2, and the differential contrast between the 800 ms and 3.7 ms TE acquisitions helps separate bone from other signal sources that would otherwise be more challenging to extract from either image independently. The shorter TE (0.8 ms in this instance) enhances the contrast between bone and internal air.

Figure 2E:
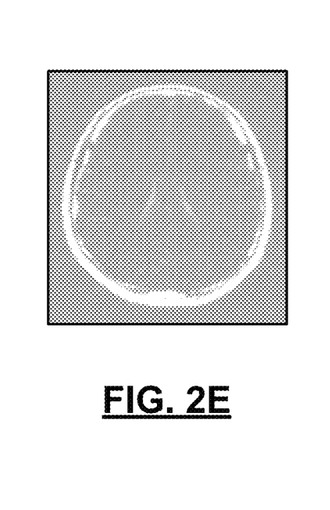
Figure 2F:
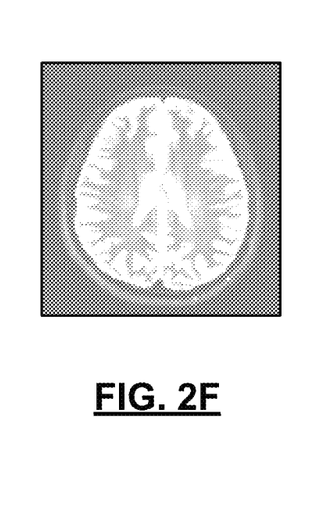

FIGS. 2E and 2F depict a fat calculated image and a water calculated image, respectively. These two image volumes were acquired, for example, using a 2-point Dixon method. The calculated fat images have been reported to estimate relative fat signal with high accuracy and the water images can aid in identifying regions with significant free fluid content. Thus, six exemplary image sequences were specifically chosen due to their ability to generate different contrasts among different tissue types in order to partially discriminate tissues with different relative electron densities, as well as to aid in delineating tumors and normal tissues during treatment planning. Other types of image sequences and imaging techniques that discriminate tissue types also fall within the scope of this disclosure.

With continued reference to FIG. 1, the data analyzer 14 generates patient models from the multiple sets of image data captured by the imager 12. More specifically, a classifier 15 is configured to receive the multiple sets of image data 13 from the imager 12 and operates to classify tissue in the volume of interest into different tissue types using a classification algorithm. A property assigner 16 is configured to receive a probability distribution of tissue types yielded by the classification algorithm and operate to assign one or more properties to voxels comprising the volume according to the probability distribution. Each of these operations will be described in more detail below. By assigning different properties to the voxels in the volume, the property assignor 16 generates different patient models 18 that may be used, for example to support treatment planning for radiation therapy.

Figure 3:
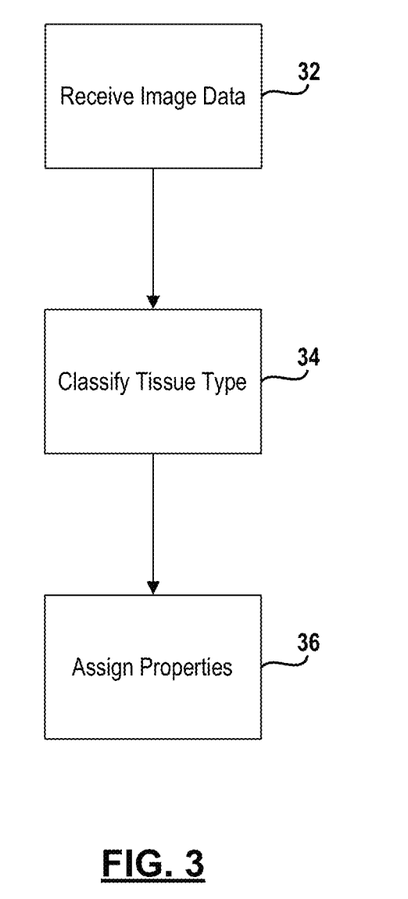
FIG. 3 is a flowchart depicting an exemplary method for generating patient models for use in radiation therapy.

FIG. 3 further illustrates the method implemented by the data analyzer 14. Multiple sets of image data representing a volume of a patient are received at 32 by the classifier 15. As noted above, each set of image data is spatially aligned with each other and is acquired in a different manner so as to create contrast amongst tissue types of the patient.

Tissue captured in the image data is then classified at 34 into different tissue types using a classification algorithm. Thus, the multiple sets of image data serve as input to the classification algorithm. Each class represents a type of tissue selected, for example, from the group consisting of bone, fat, fluid and solid tissue. Other types of tissues also fall within the scope of this disclosure. Likewise, various types of classification or clustering algorithms, such as logistic regression, may be used to classify the tissue types. For radiation therapy, tissues presenting different radiation transport properties need to be separated. These would include (in order of decreasing attenuation) bone, solid tissue, water, fat, and air. Representing these tissue types may further aid in contouring tumors and normal tissues, by allowing the physician or dosimetrist to selectively visualize images with these individual components enhanced or removed.

In an exemplary embodiment, the classification algorithm is based on a fuzzy c-mean (FCM) clustering algorithm. Spatial constraints are employed in the FCM clustering method to improve robustness of the classification under the influence of noise and intensity inhomogeneity in images. The modified objective function is used to classify a dataset $\{x_k\}_{k=1}^N \subset R^d$ into c prototype classes by $$J_m = \sum_{i=1}^{c} \sum_{k=1}^{N} u_{ik}^m \|x_k - v_i\|^2 + \alpha \sum_{i=1}^{c} \sum_{k=1}^{N} u_{ik}^m \|\bar{x}_k - v_i\|^2$$

where $u_{ik}$ represents the membership of the kth data point ($x_k$) to the ith prototype class ($v_i$), m∈[1, ∞) is a weighting exponent on each fuzzy membership, $\bar{x}_k$ is a mean or median of the neighbors within a specified kernel around $x_k$, and a is a weighting factor. The results are c N-dimensional prototype vectors to identify the nominal intensity across the N input images for each of the c different tissue classes, and c probability maps for each voxel belonging to a given class. Assigning properties (e.g., relative electron density, elasticity, etc.) to these classes or their probabilistic combinations yields images representative of one or more patient image models of interest as further described below. Correlating classified tissues with derived physiological measured (e.g. diffusion, perfusion) from MRI scans taken in the same session can also aid in longitudinal analysis of disease and the impact of therapy on tumors and normal tissues.

Figure 4A:
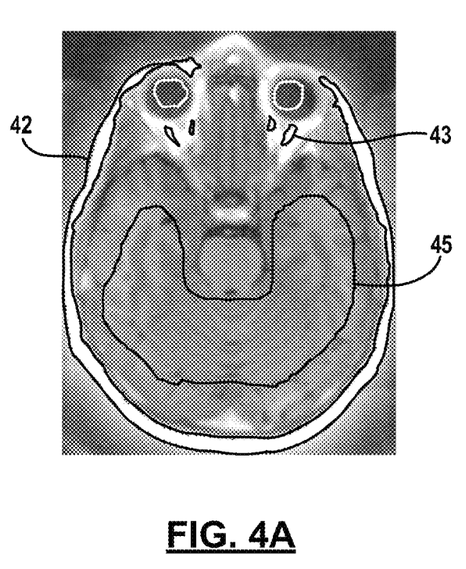
FIGS. 4A and 4B are images of the brain having identified seed regions.
Figure 4B:
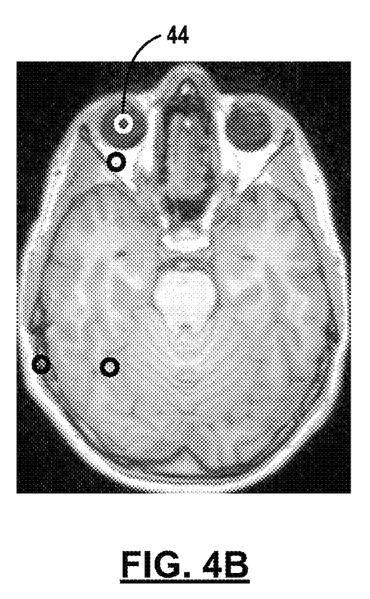

To initiate the classifier, regions in the image data indicative of a particular tissue type are identified and provided as a seed input to the classification algorithm. Seed regions were identified from the input images in anatomic regions typical of: a) bone (skull), b) fatty tissue (identified from fat image), c) free fluid (eyes, ventricles), and d) solid tissue (grey/white matter) as shown in FIGS. 4A and 4B. A bone region is noted at 42; whereas, a fat region is noted at 43. The bone and fat regions were generated by thresholding on the short TE UTE and calculated fat images, respectively. The fluid regions were selected from inside the eyes (>95% water content in the aqueous humor) as indicated at 44, and the solid tissue region was drawn within the brain as indicated at 45. While these regions were placed using a combination of manual and automated threshholding methods, existing atlas methods can also be applied to automatically seed approximate regions. Although larger regions are shown in this example in order to average heterogeneous signals of signal types intended to be included within a specific class, a region could also be a single voxel to initiate the prototype vectors, in which case that specific voxel location across all image volumes would exactly define the initiating prototype vector for the given class. Of note, fat exists to varying degrees within a subset of the voxels containing bone. One intended objective of this algorithm is to properly characterize the relative concentrations of various fat/bone mixed signals within voxels.

Figure 5:
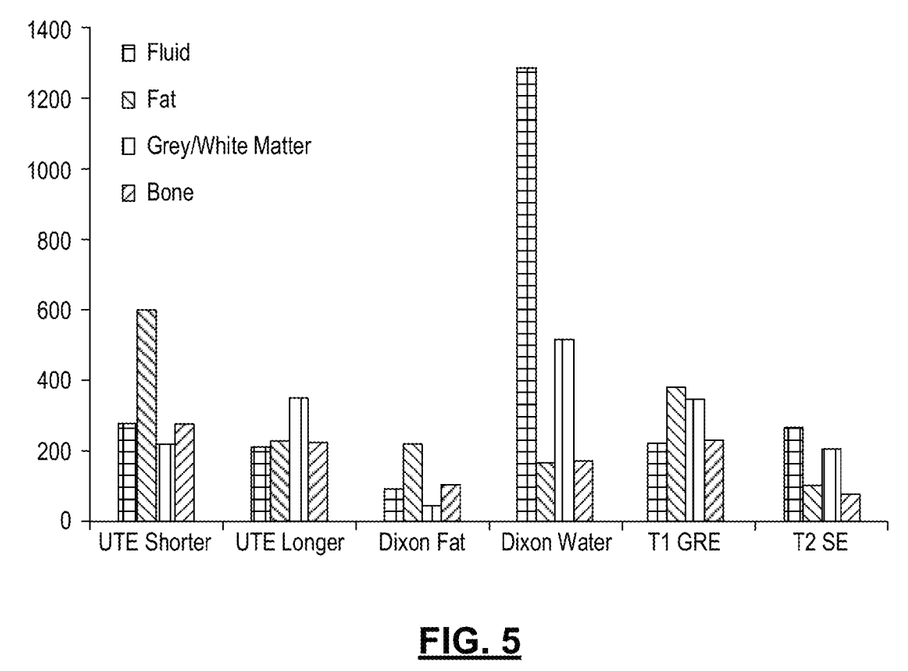
FIG. 5 is a chart showing nominal intensity values for each extracted class within each of the six sets of image data

Once complete, FCM analysis yields a final set of prototype vectors. FIG. 5 is a chart depicting nominal (voxel) intensity values for each extracted class within each of the six sets of image data. Additionally, the FCM analysis yields a probability map for each extracted class. With reference to FIGS. 6A-6D, the probability maps of class membership define the likelihood or percentage of a given class membership in a given voxel. In this example, the FCM algorithm was not applied to classify air. In addition to classification, simple intensity thresholding methods across the input images can also identify regions of air within the external patient surface.

The above method describes an instance in which the classification is optimized for each individual scan session. If the MRI intensity values are consistent across patients and imaging sessions, then a constant set of values can be applied to classification, thus reducing the computational effort for individual patients. Similarly, if normalization can minimize the variation across patient scans, the fitting component for individual patients can be reduced and/or removed.

With continued reference to FIG. 3, properties are assigned at 36 to each voxel in the volume based on the classification of tissue by the classification algorithm. More specifically, properties are assigned according to the probability distribution of tissue types yielded by the classification algorithm. In an exemplary embodiment, the probabilities from each class are combined by weighting the probability with an assigned Hounsfield unit, thereby resulting in an estimate of a representative composite CT image.

Assigning different properties to voxels in the volume generates different types of patient models which may be used in radiation therapy. For example, relative electron density maps may be generated using the classification of tissue type. For MV photon dose calculation, bulk relative electron densities of typical intracranial tissue can be approximated as: bone: 1.51; fat: 0.95; solid tissue (e.g. white matter, grey matter): 1.04 and free fluid (e.g. CSF, 99% of vitreous humor): 1.00. Using the class membership probability maps, an exemplary algorithm has been selected to assign an electron density value to a given voxel. The four probability maps (fluid, fat, solid tissue, bone) give the probability distributions (pw, pf, pt, pb) for membership in each of the classes, respectively. The relative electron density (RED) formula is given as follows:

$$RED=1.0*pw+0.95*pf+1.04*pt+1.51*pb \quad \text{(equation 1)}$$

Figure 6A:
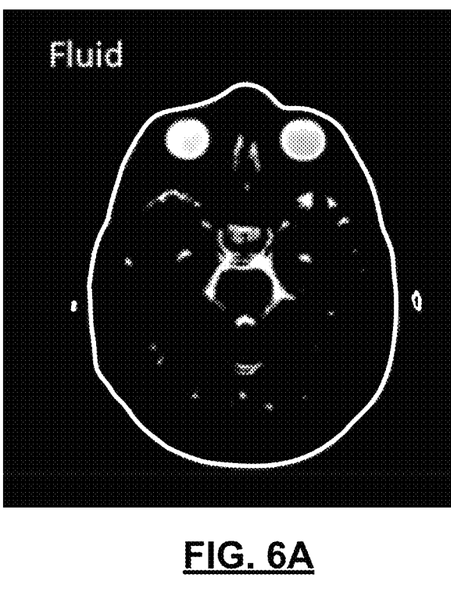
FIGS. 6A-6D illustrate probability maps for each extracted classes of fluid, fat, solid tissue and bone, respectively.
Figure 6B:
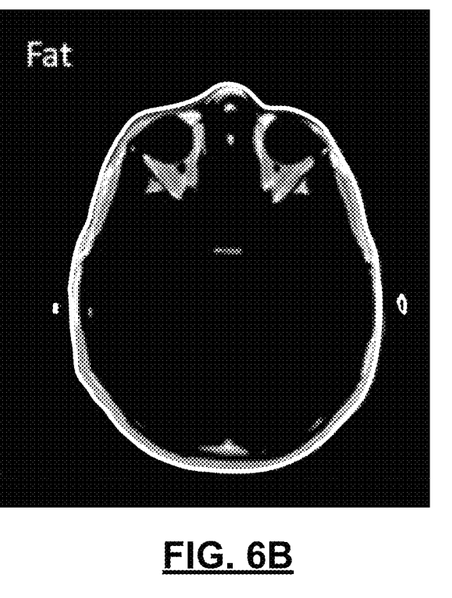
Figure 6C:
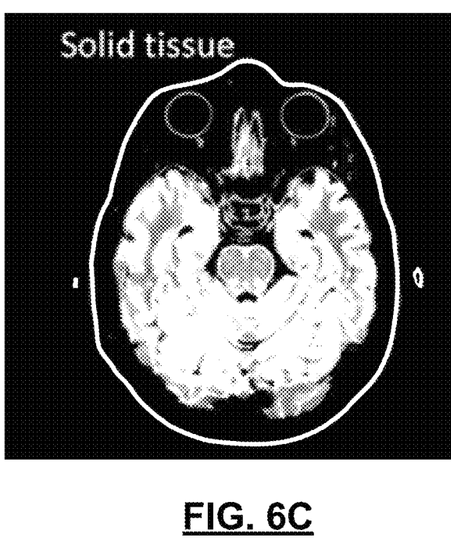
Figure 6D:
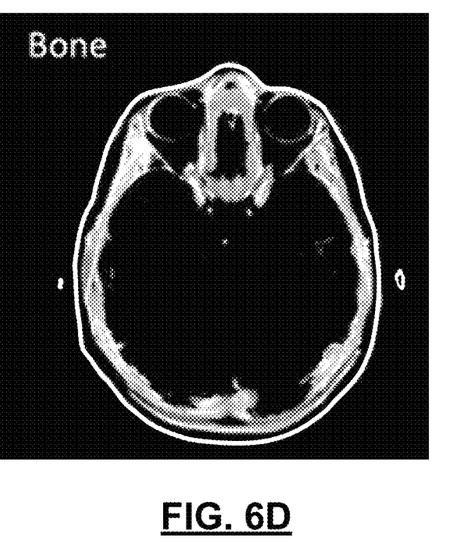
Figure 7A:
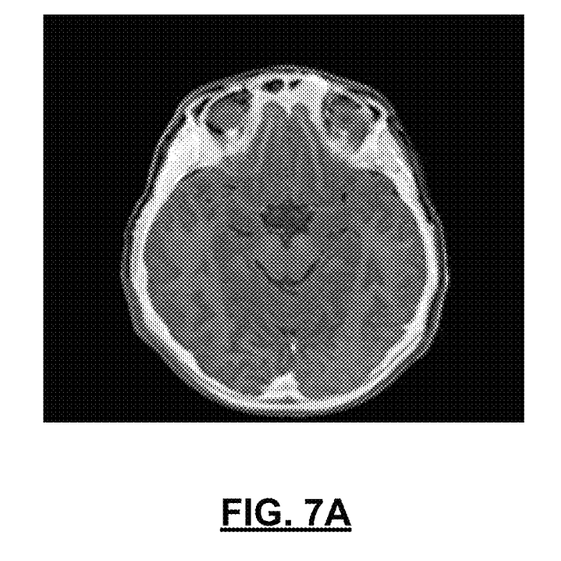
FIGS. 7A and 7B illustrates an exemplary relative electron density image and a digitally reconstructed radiograph generated by projecting through the entire derived image volume, respectively.
Figure 7B:
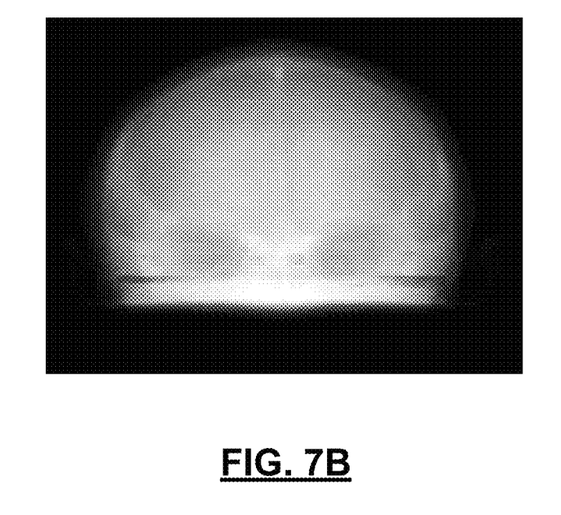

In this way, an electron density value is assigned to a given voxel according to the probability distribution associated with the given voxel, and can account for the mixing of multiple tissue type within that voxel. FIGS. 6A and 6B illustrates an example enhanced axial image, in which the relative electron density assignments from the classified tissues have been applied, and a digitally reconstructed radiograph generated by projection through the RED-assigned image volume, respectively.

Depending on the robustness of the classifications, additional statistical methods may be used to enhance the probability assignments. For example, if a series of investigations determines the precision of probability assignment to be x %, then all voxels with probability less than x % can be excluded from classification (reassigned to zero probability), and all voxels within 100%–x may be potentially labeled as purely consisting of the specified class (i.e., assignment of all other memberships to 0%). In another example, the fat image from the Dixon acquisition can be used to quantitate the distribution of cf, the fractional fat concentration present in a given voxel. This value can be used to modify the formula in equation 1 to substitute pf for cf for voxels in which pf exceeds the threshold that distinguishes the presence of fat from the uncertainty in characterization.

Applying biomechanical properties (e.g. Poisson ratio, Young's modulus, etc.) to tissue classes is another type of property assignment. By establishing the principal tissue components within each voxel, known elemental tissue properties can be assigned, and thus a finite element model can be assembled that reflects the local tissue behavior under forces such as muscle contractions as well as forces such as tumor growth/reduction and edema. In an exemplary embodiment, a predominant tissue type may be determined for each voxel from the probability distribution yielded by the classification algorithm. Depending upon the predominant tissue type, a value for the biomechanical property is then assigned to each voxel, thereby generating another type of patient model. These types of models can be used as an aid in defining the extent to which tissue types may change shape or relative position over the course of treatment. They may aid in relating patient images at different times during the course of treatment and subsequent to therapy (e.g. for post-treatment assessment). They can also be used to simulate the behavior of imaging and focused therapeutic systems (e.g. focused ultrasound).

Another example of property assignment relates to attenuation correction for PET-MRI. In this example, attenuation properties are assigned to each voxel using the probability distribution yielded by the classification algorithm, thereby generating yet another type of patient model. The ability to define local attenuation properties supports direct attenuation mapping from MRI, which is needed to more accurately correct the PET signals for the attenuation of the positron-decay photons passing through different amounts of attenuating tissue before detection. In this example, the same attenuation principles applied to external beamradiation treatment planning are used with attenuation properties specifically selected for the energy of the photons (511 KeV).

In another aspect of this disclosure, the newly generated patient models may be interactively visualized, for example on a display of the secondary computing device 19. A physician may wish to reduce the influence of the skull temporarily while attempting to draw a tumor near the skull edge. He/she may wish to see the amount of fluid turned on or off interactively while attempting to separate tumors from edema. The interactive weighting of tissue types or fundamental components of tissue while drawing normal tissues or selecting anatomic regions of normal tissue for injury assessment is of value. By having tissue types identified, a user display can be applied in which the relative contributions of each signal type can be interactively adjusted, and other visualizations (e.g. colorwash of fat over a T1 weighted image) can be applied as well. Given the patient models as input, it is understood that the secondary computing device can be configured to achieve the visualization techniques set forth above.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for generating patient models for use in radiation therapy, comprising:
   receiving, by a computing device having a processor, multiple sets of image data representing a volume of a patient, each set of image data is spatially aligned with each other and is acquired in a different manner so as to create contrast amongst tissue types of the patient;
   classifying, by the computing device, tissue in each voxel in the volume into different classes using a classification algorithm, where the multiple sets of image data serve as input to the classification algorithm, and each class represents a type of tissue, and classifying tissue yields a probability distribution for membership in each class;
   assigning, by the computing device, a value of a property to each voxel in the volume, where the value for a given voxel is derived from probability distributions that correspond to the voxel and is computed as a weighted sum of probability distributions from each class associated with the given voxel and the property differs from tissue type; and
   generating a patient model for the volume from the properties assigned to each voxel.

2. The computer-implemented method of claim 1 further comprises acquiring the multiple sets of image data by at least one of varying a pulse sequence or acquisition parameters of magnetic resonance imaging between each set of image data in the multiple sets of image data.

3. The computer-implemented method of claim 1 further comprises
   acquiring a first set of image data in a first manner that discriminates bone from other tissue types;
   acquiring a second set of image data in a second manner that discriminates soft tissue from other tissue types; and
   acquiring a third set of image data in a third manner that quantifies water and fat tissue in the volume.

4. The computer-implemented method of claim 1 further comprises identifying a region in the image data indicative of a particular tissue type and inputting the region as an input to the classification algorithm.

5. The computer-implemented method of claim 1 wherein classifying tissue type further comprises using a fuzzy c-mean clustering algorithm as the classification algorithm.

6. The computer-implemented method of claim 1 wherein assigning properties further comprises assigning an electron density value to a given voxel according to the probability distribution associated with the given voxel.

7. The computer-implemented method of claim 1 wherein assigning properties further comprises assigning at least one of a Poisson ratio and a Young's modulus value to a given voxel according to the probability distribution associated with the given voxel.

8. The computer-implemented method of claim 1 wherein assigning properties further comprises assigning an attenuation value to a given voxel according to the probability distribution associated with the given voxel, the attenuation value indicative of positron decay from positron emission tomography.

9. A computer-implemented method for generating patient models for use in radiation therapy, comprising:
   acquiring, by a magnetic resonance imager, multiple sets of image data by varying at least one of a pulse sequence or acquisition parameters of magnetic resonance imaging between each set of image data in the multiple sets of image data, where each set of image data represents a volume of a patient and is spatially aligned with each other;
   classifying, by a computing device having a processor, tissue in the multiple sets of image data into different tissue types using a classification algorithm, where the multiple sets of image data serve as input to the classification algorithm and each class represents a type of tissue selected from the group consisting of bone, fat, fluid and solid tissue;
   assigning, by the computing device, a first type of property to voxels comprising the volume based on a probability distribution of tissue types yielded by the classification algorithm, where the value for the first property type assigned to a given voxel is a mathematical combination of the probability distribution for each tissue type; and
   assigning, by the computing device, a second type of property to the voxels based on the probability distribution of tissue types, the second type of property being different from the first type of property and the value for the second property type assigned to a given voxel is a mathematical combination of the probability distribution for each tissue type.

10. The computer-implemented method of claim 9 wherein acquiring the multiple sets of image data further comprises
   acquiring a first set of image data in a first manner that discriminates bone from other tissue types;
   acquiring a second set of image data in a second manner that discriminates solid tissue from other tissue types; and
   acquiring a third set of image data in a third manner that quantifies water and fat tissue in the volume.

11. The computer-implemented method of claim 10 further comprises acquiring the first set of image data using gradient echo imaging sequences.

12. The computer-implemented method of claim 10 further comprises acquiring the second set of image data using spin echo imaging sequences.

13. The computer-implemented method of claim 9 wherein classifying tissue type further comprises using a fuzzy c-mean clustering algorithm as the classification algorithm.

14. The computer-implemented method of claim 13 wherein assigning properties further comprises assigning a given tissue type to a given voxel when a probability assignment for the given tissue type exceeds a confidence threshold.

15. The computer-implemented method of claim 13 wherein assigning properties further comprises assigning an electron density value to a given voxel according to the probability distribution associated with the given voxel.

16. The computer-implemented method of claim 13 wherein assigning properties further comprises assigning at least one of a Poisson ratio and a Young's modulus value to a given voxel according to the probability distribution associated with the given voxel.

17. The computer-implemented method of claim 13 wherein assigning properties further comprises assigning an attenuation value to a given voxel according to the probability distribution associated with the given voxel, the attenuation value indicative of positron decay from positron emission tomography.

18. A computer-implemented system for patient models for use in radiation therapy, comprising
   a magnetic resonance imager configured to capture multiple sets of image data represents a volume in a patient and is spatially aligned with each other, where each set of image data is acquired in a different manner so as to create contrast amongst tissue types contained in the volume;
   a classifier configured to receive the multiple sets of image data from the magnetic resonance imager and operable to classify tissue in each voxel in the volume into different tissue types using a classification algorithm, such that each class represents a type of tissue and classifying yields a probability distribution for membership in each class; and
   a property assigner configured to receive a probability distribution of tissue types for the volume and operable to assign a property to voxels comprising the volume according to the probability distribution, where the value for a given voxel is derived from probability distributions that cooresspond to the voxel and is computed as a weighted sum of probability distributions from each class associated with the given voxel and the property differs from tissue type; and generating a patient model for the volume from the properties assigned to each voxel.

* * * * *